United States Patent [19]

Adler et al.

[11] Patent Number: 5,205,493

[45] Date of Patent: Apr. 27, 1993

[54] PROCESS FOR PRODUCING A CARBONATE COMPOSITION

[76] Inventors: Paul E. Adler, 103 Georgetown Ct., Macon, Ga. 31210; Charles B. Denholm, 3340 Scarret Oak La., Appleton, Wis. 54915

[21] Appl. No.: 927,325

[22] Filed: Aug. 10, 1992

Related U.S. Application Data

[62] Division of Ser. No. 806,717, Dec. 12, 1991.

[51] Int. Cl.[5] .............................................. C01F 5/24
[52] U.S. Cl. ........................................ 241/21; 241/24
[58] Field of Search .................... 241/21, 24, 20, 62, 241/79

[56] References Cited

U.S. PATENT DOCUMENTS

| | | |
|---|---|---|
| 1,260,448 | 3/1918 | Rafsky . |
| 1,863,663 | 6/1932 | Lauderman . |
| 3,107,142 | 10/1963 | Schoeffel et al. . |
| 3,512,722 | 5/1970 | Hall . |
| 4,100,264 | 7/1978 | Heytmeijer et al. ............... 423/430 |
| 4,131,508 | 12/1978 | Laakso ............................. 162/30 K |
| 4,272,498 | 6/1981 | Faatz ................................ 423/242 |
| 4,311,666 | 1/1982 | Hultman et al. ..................... 422/62 |
| 4,519,806 | 5/1985 | Copenhafer et al. .............. 423/421 |
| 4,732,748 | 3/1988 | Stewart et al. . |
| 4,793,985 | 12/1988 | Price et al. ....................... 423/430 |
| 4,941,945 | 7/1990 | Pettersson . |

*Primary Examiner*—Douglas D. Watts
*Attorney, Agent, or Firm*—Foley & Lardner

[57] ABSTRACT

A process for obtaining a sodium hydroxide solution and a slurry of fine calcium carbonate particles suitable for use as a paper coating or filler pigment includes the initial step of reacting a calcium hydroxide with sodium carbonate under conditions effective to produce an aqueous slurry containing sodium hydroxide and calcium carbonate as a precipitate. The aqueous sodium hydroxide solution is then removed from the first slurry by suitable means such as filtration. The slurry is reconstituted, and a fine fraction comprising an aqueous slurry of fine metal carbonate particles is removed from by suitable means such as a classifying device. The second half of the process can be used independently to process mined calcium carbonate. This includes steps of classifying the carbonate slurry to remove a coarse fraction comprising carbonate particles larger than a predetermined particle size to obtain a slurry of fine carbonate particles, grinding the coarse fraction to reduce the size of carbonate particles therein to form a ground product, and reclassifying the coarse fraction to obtain an additional quantity of a slurry of fine carbonate particles. The ground product is preferably combined with fresh aqueous slurry to form a combined product, and the classifying step is repeated continuously or intermittently in a closed circuit using the combined product to obtain a slurry of fine carbonate particles.

20 Claims, 1 Drawing Sheet

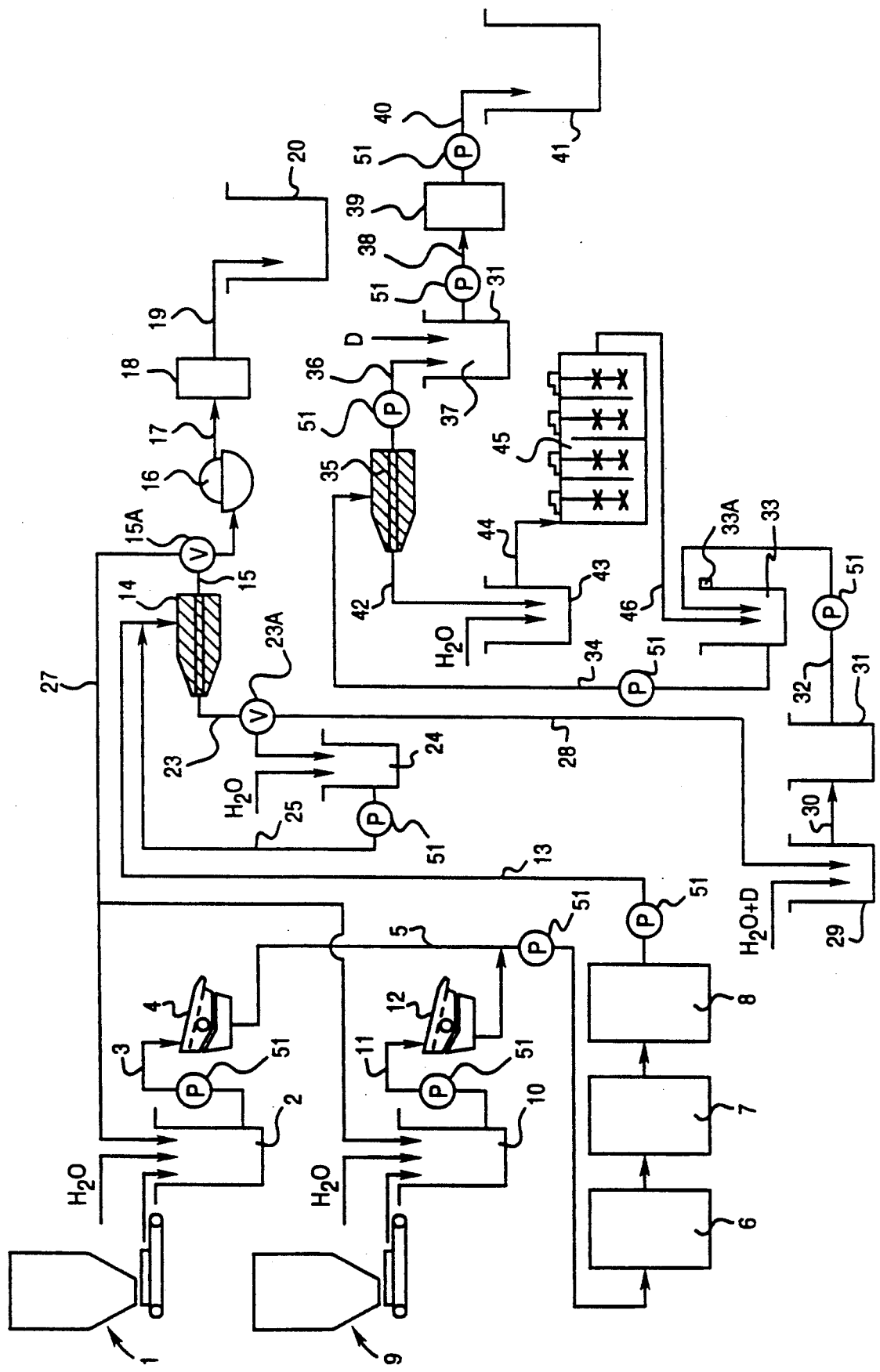

PROCESS FOR PRODUCING A CARBONATE COMPOSITION

This is a divisional of U.S. Ser. No. 07/806,717 filed on Dec. 12, 1991.

TECHNICAL FIELD

This invention relates to a process for making a carbonate composition, particularly a slurry of fine calcium carbonate particles suitable for use primarily in paper filling and coating, and also in non-paper areas such as rubber and plastics, paints and textiles.

BACKGROUND OF THE INVENTION

A known caustic soda (NaOH) manufacturing process is carried out by reacting dissolved soda ash ($Na_2CO_3$) with hydrated lime ($Ca(OH)_2$) to produce caustic soda and a precipitated calcium carbonate byproduct. The reaction occurs in an aqueous slurry at a dilute concentration, generally 10%. The reaction mechanism for the lime-soda process is:

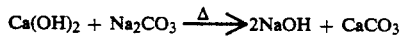

See Hultman et al. U.S. Pat. No. 4,311,666, issued Jan. 19, 1982. The reaction temperature and residence time are adjusted to maximize the NaOH yield. Soda ash is available from a variety of sources, and may be recovered from aqueous sodium carbonate solutions by a method involving evaporation and centrifugation as described in Copenhafer et al. U.S. Pat. No. 4,519,806, issued May 28, 1985.

Calcium carbonate is used in the paper industry for paper filling and coating applications in the form of a slurry of fine calcium carbonate particles in water, with other known additives. See, for example, the calcium carbonate pigment described in Japanese Pat. No. 82-30814. It is known to use a neutralized copolymer of (meth)acrylic acid and maleic or fumaric acid as a stabilizer in such a composition; see Japanese patent publication 53144499 (1978).

Calcium carbonate is both mined and made synthetically by a variety of well known processes. See, for example, Heytmeijer et al. U.S. Pat. No. 4,100,264, issued Jul. 11, 1978, wherein calcium carbonate is produced from calcium chloride, and Faatz U.S. Pat. No. 4,272,498, issued Jun. 9, 1981, which discloses a method of making a fine calcium carbonate slurry by reaction with carbon dioxide. Pettersson U.S. Pat. No. 4,941,945, issued Jul. 17, 1990, concerns a method of precipitating calcium carbonate by treatment of green liquor with caustic lime. Japanese patent publication 62-171921 produces a fine calcium carbonate suitable for use a paper filler by use of a gas-liquid plane contact reactor.

Other processes have been proposed for recovering calcium carbonate produced by the lime-soda reaction and other reactions in cake form. See Japanese patent publication 73-9720 (also recovering NaOH), and Soviet Union patent publication Nos. 490,755, 522,136, 560,829, and 691,401. Use of lime muds obtained during causticisation of Kraft paper pastes to recover $CaCO_3$ for use as a paper pigment has been proposed in French Pat. No. 2,570,721 (1986). French Pat. No. 2,544,353 (1984) recovers $CaCO_3$ by treatment of liquor for causticisation.

Despite the many methods available for the production of calcium carbonate and sodium hydroxide, a need remains for a process which can efficiently produce calcium carbonate of a grade suitable for paper industry applications, particularly in combination with sodium hydroxide also useful in paper making processes. The present invention addresses this need.

SUMMARY OF THE INVENTION

A process for obtaining a concentrated alkali metal hydroxide and fine metal carbonate particles according to the invention includes the steps of reacting a metal hydroxide with an alkali metal carbonate under conditions effective to produce an aqueous slurry containing an alkali metal hydroxide and the corresponding metal carbonate as a precipitate, removing the aqueous alkali metal hydroxide solution from the first slurry by suitable means such as a dewatering device, and removing an aqueous slurry of fine metal carbonate particles from the slurry by suitable means such as a classification device.

According to one aspect of the invention, the process comprises the steps of reacting calcium hydroxide ($Ca(OH)_2$) with sodium carbonate ($Na_2CO_3$) under conditions effective to produce a first aqueous slurry containing sodium hydroxide and precipitated calcium carbonate, dewatering the first slurry to remove an aqueous sodium hydroxide solution therefrom, reconstituting the first slurry with water, comminuting the precipitated calcium carbonate in the first slurry, and classifying the first slurry containing comminuted calcium carbonate particles to remove a second aqueous slurry therefrom, which second slurry contains fine calcium carbonate particles.

According to a further aspect of the invention, a process for the production of a carbonate composition, such as an aqueous calcium carbonate slurry, includes the steps of preparing an aqueous slurry of particles of a carbonate, classifying the slurry to remove a coarse fraction comprising carbonate particles larger than a predetermined particle size therefrom to obtain a slurry of fine carbonate particles, grinding the coarse fraction to reduce the size of carbonate particles therein to form a ground product, and reclassifying the coarse fraction to obtain an additional quantity of a slurry of fine carbonate particles. The ground product is preferably combined with fresh aqueous slurry to form a combined product, and the classifying step is repeated continuously or intermittently using the combined product to obtain the fine carbonate particle slurry. Such a process is independent of how the carbonate was made or obtained.

The invention further provides an apparatus for carrying out the foregoing processes using the components described below.

BRIEF DESCRIPTION OF THE DRAWING

The drawing is a schematic diagram of an apparatus according to the invention.

DETAILED DESCRIPTION

The drawing illustrates an exemplary system in which the process of the invention may be carried out on an industrial scale. A metal oxide, preferably an alkaline earth metal oxide such as lime in particulate form, is loaded into a gravimetric weigh feeder 1. Controlled amounts of lime are released by gravimetric feeder 1 and fed into a lime slaker 2, wherein the lime is mixed with water and stirred. Water reacts with the lime to form calcium hydroxide (hydrated lime). Excess water is preferably added to form a calcium hydroxide suspension in order to optimize the straining operation that follows. The resulting calcium hydroxide suspension is fed via a pipe or other suitable conduit 3 through a vibratory screen 4 having a screen pore size of from about 150 to 325 mesh to remove solid impurities such as sand.

The carbonate is prepared separately from the calcium hydroxide. A particulate alkali metal carbonate, preferably sodium carbonate, is loaded into a second gravimetric weigh feeder 9. Controlled amounts of the sodium carbonate are released by feeder 9 and mixed with water in a dissolving tank 10 to dissolve the sodium carbonate. The solution containing sodium carbonate is fed through a line 11 through a vibratory screen 12, which may be identical to vibratory screen 4, to remove impurities.

The sodium carbonate and calcium hydroxide are fed from screens 4, 12 through a branched line 5 wherein the sodium carbonate and calcium hydroxide are combined and fed to a first causticizer 6. Causticizer 6 is most preferably a continuously stirred, non-pressurized, insulated tank equipped with a heater to maintain a suitable reaction temperature, generally 190° to 210° F. for the reaction between sodium carbonate and calcium hydroxide. Optional additional causticizers 7 and 8, which may be cascaded from causticizer 6, are provided to ensure that the product drawn from the third causticizer 8 is completely reacted. For the sodium carbonate-calcium hydroxide reaction, total residence time is normally at least about 3 hours to ensure a complete reaction.

The product is an aqueous slurry containing sodium hydroxide and precipitated metal carbonate. The slurried calcium carbonate is predominantly rhombic in morphology. It has, as a direct consequence of the conditions established for the caustic soda process in causticizers 6–8, a bimodal particle size distribution. The finer modal cluster comprises 20–40% of particles with particle sizes (maximum dimension or diameter) less than 2 $\mu$m, with virtually no particles finer than 0.1 $\mu$m.

The aqueous slurry is fed from the third causticizer 8 through a line 13 into a suitable dewatering device, for example, a decanting/filtration apparatus, preferably a continuous feed solid bowl centrifuge 14, wherein approximately 97% of the sodium hydroxide and 97% of the water are separated from the slurry. The separated sodium hydroxide solution is then, if necessary, fed through a line 15 through a conventional polish filter 16, or a small rotary drum filter or plate and frame filter, to clarify the solution by removing fine solid particles that may give the solution a cloudy appearance.

The aqueous solution, which preferably has a concentration of from about 8 to 12 wt. % NaOH, may then be fed through a line 17 to an optional multiple-effect evaporator 18 wherein water is evaporated to yield a concentrated sodium hydroxide solution of from about 13 to 35 Wt. % NaOH. An upper limit of 35 wt. % is preferred because the solution can be concentrated in a standard stainless steel evaporator, although concentrations as high as 36 to 50 wt. % or more NaOH may be used if desired if a corrosion-resistant evaporator is used.

If the apparatus according to the invention is used in tandem with a pulp mill operation, the evaporation step may be omitted. The sodium hydroxide solution is then fed through a line 19 to a finished caustic soda storage tank 20, from which amounts are withdrawn as needed in a pulp mill operation.

The calcium carbonate slurry from centrifuge 14 consists of approximately 70 to 90%, preferably 80 to 90% calcium carbonate, with the balance being sodium hydroxide and water. This composition is fed through a line 23 and a 3-way diverter valve 23A to a reconstitution tank 24. In tank 24, the slurry is reconstituted with fresh water to obtain a slurry containing, for a typical starting slurry comprising 80 wt.% carbonate, approximately 11% metal carbonate, 0.3% sodium hydroxide, and 88.7% water. The reconstituted slurry is returned through a line 25 to centrifuge 14 for a second decanting step to separate sodium hydroxide and water from the slurry. The second dilute, aqueous sodium hydroxide solution thus removed, consisting of approximately 99+ wt. % water, may be recycled through a 3-way valve 15A in line 15 through a branched line 27 as make-up water in tanks 2, 10. The net effect of the recycling step results in recovering as much as 99.9% of the sodium hydroxide.

The twice-filtered calcium carbonate slurry is then fed again to valve 23A. Valve 23A is actuated to send the slurry through a branch line 28 to a mixing tank 29. In tank 29, the slurry is reconstituted with a sufficient amount of fresh water to yield an aqueous slurry containing about 30 to 60 wt. %, preferably 30 to 50 wt. %, precipitated calcium carbonate.

A dispersant (D) is added together with water to the slurry in tank 29. The dispersant may be any conventional surface active agent that prevents the solids in the slurry from settling out from the water. A preferred dispersant is a polyacrylic acid polymer with a narrow molecular weight distribution. Upon addition of the acidic dispersant, the residual caustic soda (e.g., about 1.6 pounds/dry ton $CaCO_3$) becomes an integral part of the dispersant system, neutralizing the acid polymer to a functional sodium polyacrylate. The amount of dispersant generally ranges from about 5 to 30 pds/dry ton $CaCO_3$. Once a batch of dispersant-treated slurry is made in tank 29, it is fed through a line 30 into a temporary storage tank 31, and tank 30 is then refilled with slurry from decanting centrifuge 14.

The slurry is fed as needed from tank 31 through a line 32 to a mixing tank 33. Tank 33 forms part of a closed circuit wherein comminuted, recycled calcium carbonate is combined with fresh slurry from tank 31. The recycled calcium carbonate is hot from the grinding operation described below, and is combined with fresh slurry in sufficient proportion to increase the temperature of the combined slurry to an elevated temperature, generally 100° to 200° F. Mixing tank 33 may be provided with a conventional level sensor 33A. Sensor 33A detects the level of slurry in tank 33 and actuates an associated pump 51 to draw additional fresh slurry from tank 31 whenever the slurry level in tank 33 falls below the predetermined height.

The combined slurry is continuously or intermittently fed through a line 34 to a classifying device, preferably a high speed centrifuge 35, which yields a fine carbonate fraction and a coarse carbonate fraction, both in slurry form. The fine fraction is preferably a slurry in which at least 90% of the calcium carbonate particles have particle sizes less than 2 $\mu$m, but can be as low as 60% less than 2 $\mu$m. This provides a fine slurry useful in paper making and coating. This slurry is discharged through a line 36 to a storage tank 37. The fine fraction is then fed through a line 38 to an optional evaporator 39, preferably a single stage, forced circulation evaporator which concentrates the metal carbonate particles to finished product specifications. Additional dispersant may be added to the slurry as needed prior to the evaporation step. The calcium carbonate slurry is then fed through a line 40 to a finished product storage tank 41.

The coarse fraction is discharged via a line 42 into a reconstitution tank 43. Water is added to reconstitute the coarse fraction prior to grinding to 30 to 60 wt. %, preferably 30 to 50 wt. % solids as noted above. The coarse fraction slurry is then fed from tank 43 through a line 44 to a grinder 45, preferably a vertical media mill, such as the type manufactured by Blake & Pendleton, of Macon, Ga., containing a grinding medium such as classified sand or glass particles. Grinder 45 reduces the particle size of the calcium carbonate particles in the coarse fraction so that a substantial number become small enough to become part of the fine fraction upon recentrifugation. The ground slurry product is then recycled through a line 46 back to mixing tank 33 to be combined with the fresh slurry from tank 31 and fed to centrifuge 35. This sequence is repeated ad infinitum.

The apparatus of the invention preferably includes conduits and associated feeders or pumps where needed to feed or circulate the slurry or solution. For example, centrifugal pumps 51 are preferably incorporated into some or all of lines 3, 5, 11, 13, 26, 32, 34, 36, 40 and 44, and optionally elsewhere, to facilitate operation. Of course, the reactants, slurries and solutions can also be gravity fed directly from one component to another, or transported manually. In one configuration, suitable means such as pumps, conduits, intermediate storage tanks, gravity discharge outlets or the like are provided to feed the slurry from causticizer(s) 6–8 to the dewatering device (centrifuge 14), from the dewatering device to grinder 45, from grinder 45 to the classifier (centrifuge 35), from the classifier to evaporator 39, and then to storage tank 41.

The various tanks used in the apparatus of the invention may be of any desired configuration. Since it is desirable to maintain the slurries and NaOH solutions in a uniform state, the storage and mixing tanks used in the apparatus are preferably designed to maintain contents at a predetermined temperature and are provided with a stirrer or agitator and appropriate auxiliary heat exchangers. Preferably, each of tanks 24, 29, 31, 33 and 43 are baffled tanks continuously stirred with a high speed agitator. Causticizers 6–8 are baffled with fixed speed agitators, and storage tanks 20, 37 and 41 also have fixed speed agitators. Water is introduced where needed by any suitable means, such as valved outlets from a central water system. Operation of the entire apparatus may be automated, with suitable controllers for actuating each of the pumps and valves and introducing reactants in accordance with a coordinated timing sequence.

A unique aspect of the process of the invention lies in the confluence of the four unit operations of precipitation, comminution, separation and concentration. With respect to precipitation, 20–40% of the metal carbonate particles contained within the virgin precipitate produced according to the process of the subject invention have particle sizes less than 2 $\mu$m. Thus, the process disclosed herein allows recovery of a third of the finished metal carbonate particles directly from the virgin precipitate.

As to comminution, the grinding mill is utilized in a closed circuit design to assure optimum comminution efficiency by virtually eliminating the presence of fines, i.e., submicron particles, through use of a closed system. This adds another unique benefit. Dispersant consumption, which is usually the highest single operating expense, is substantially reduced due to lower surface area as a consequence of fines elimination. Like more expensive titanium dioxide slurries, the calcium carbonate slurry of the invention has a very narrow particle size distribution. In particular, the carbonate slurry contains virtually no particles finer than 0.3, particularly 0.1, microns, with about 96–98% of particles less than 2 microns in particle size. Additionally, unlike typical metal carbonate wet grinding circuits, where solids levels generally exceed 70%, the concentration of metal carbonate particles in the grinding circuit of the subject invention does not generally exceed 50%, particularly 40%. This results in higher net production rates on a dry basis.

With respect to separation, the use of a high speed centrifuge is multifaceted. The centrifuge splits off the <2 $\mu$m feed comprising both the virgin precipitate and discharge from the grinding circuit. The classification efficiency of the centrifuge is further enhanced by having the slurry fed at a level of 40–50% solids and at elevated temperature provided by the grinding heat referred to above, since the slurry functions as a heat sink for the comminution. Moreover, the coarse fraction from the centrifuge is returned to the grinding mill circuit, eliminating waste.

The evaporator system provides an extremely efficient mechanism to concentrate the dilute fine product to conventional finished product slurry specifications. Final rheological characteristics will also be favorably enhanced due to the evaporation process.

The apparatus of the invention may be built as a satellite facility at a pulp mill site, providing caustic soda to the pulp mill at a standard concentration. The satellite plant also generates a pure calcium carbonate as a byproduct of the caustic soda manufacturing operation. This pure byproduct becomes is the raw material feed for the subsequent stages of the process of the invention which produce a coating or filler grade calcium carbonate slurry. This slurry can be pumped directly to the associated paper mill for immediate use.

The following represents a typical example of the process of the invention generally described above. Units are parts by weight. The initial slurry from causticizers 6–8 comprises 2,000 parts $CaCO_3$, 1,600 parts NaOH, and 14,400 parts $H_2O$. The slurry is fed to decanting centrifuge 14, where the centrifugate, consisting of 1,550 parts NaOH and 13,950 parts $H_2O$, is fed through polish filter 16 and sent to finished storage tank 20. The yield at this point is about 97%.

The coarse fraction, consisting of 2000 parts $CaCO_3$, 50 parts NaOH and 450 parts $H_2O$, is reconstituted with fresh water to yield 2000 parts $CaCO_3$, 50 parts NaOH and 15,950 parts $H_2O$. The slurry is again fed to decanting centrifuge 14, where the centrifugate, consisting of 48.4 parts NaOH and 15,451.6 parts $H_2O$, is recycled as make up water for the lime slaking and soda ash dilution steps. The net effect is that the actual yield of caustic soda is 99.9%.

The substrate, now containing 2000 parts $CaCO_3$, 1.6 parts NaOH and 498.4 parts $H_2O$, is reconstituted with 2500 parts fresh water and an effective amount of polyacrylic acid polymer dispersant, yielding a $CaCO_3$ concentration of 40 wt. %. The CaCO$_3$ slurry is then fed to mixing tank 33 as described above, wherein it is combined with grinder products. The combined slurry is then fed to high speed centrifuge 35 adjusted to classify the fine fraction at 90% <2 μm. The coarse fraction discharges to reconstitution tank 43, whereafter it is comminuted and recycled as described previously. The fine fraction from centrifuge 35 discharges to intermediate fine product tank 37, from which it is fed to evaporator 39 and concentrated to finished product specifications.

According to a further aspect of the invention, the step of precipitating calcium carbonate may be omitted, and mined calcium carbonate, or calcium carbonate made by another process, may be used instead. In this case the calcium carbonate may be mixed with dispersant and water and fed into mixing tank 33. The process then proceeds as described above. A corresponding exemplary apparatus for carrying out this process is the same as the complete system described above, except that the components upstream from tank 29 are omitted.

It will be understood that the foregoing description is of preferred exemplary embodiments of the invention, and that the invention is not limited to the specific forms shown. For example, while the process has been described for the preparation of calcium carbonate and sodium hydroxide, other comparable metal hydroxides and alkali metal hydroxides could also be employed. These and other modifications may be made without departing from the scope of the invention as expressed in the appended claims.

We claim:

1. A process for the production of a carbonate composition, comprising the steps of:
   preparing an aqueous slurry of particles of a carbonate;
   classifying the slurry to remove a coarse fraction comprising carbonate particles larger than a predetermined particle size therefrom to obtain a slurry of fine carbonate particles by centrifuging the aqueous slurry;
   combining the coarse fraction with water;
   then grinding the coarse fraction to reduce the size of carbonate particles therein to form a ground product;
   combining the ground product with fresh aqueous slurry to form a combined product; and
   reclassifying the coarse fraction to obtain an additional quantity of a slurry of fine carbonate particles by repeating the classifying step using the combined product to obtain the fine carbonate particle slurry, wherein the process is carried out in a closed circuit system including a tank wherein the ground product is combined with the fresh aqueous slurry, a centrifuge, a tank wherein water is added to the coarse fraction, and a grinder are connected in the foregoing order by conduits.

2. The process of claim 1, wherein the carbonate is calcium carbonate.

3. The process of claim 2, further comprising combining the coarse fraction with water prior to grinding so that the coarse product has a solids content in the range of about 30 to 60 wt. % during grinding and centrifugation.

4. The process of claim 2, further comprising a step of evaporating excess water from the slurry of fine carbonate particles.

5. The process of claim 2, wherein the calcium carbonate particles in the slurry of fine carbonate particles have particle sizes of less than about 2 microns.

6. An apparatus for the production of hydroxide and carbonate compositions, comprising:
   means for reacting calcium hydroxide with sodium carbonate under conditions effective to produce a first aqueous slurry containing sodium hydroxide and calcium carbonate as a precipitate;
   means for filtering the first slurry to remove an aqueous sodium hydroxide solution therefrom;
   means for diluting the first slurry with water;
   means for comminuting the precipitated calcium carbonate in the first slurry; and
   means for classifying the first slurry containing comminuted calcium carbonate particles to remove a second aqueous slurry therefrom, which second slurry contains fine calcium carbonate particles.

7. An apparatus for the production of hydroxide and carbonate compositions, comprising:
   a causticizer for reacting calcium hydroxide with sodium carbonate under conditions effective to produce a first aqueous slurry containing sodium hydroxide and calcium carbonate as a precipitate;
   a filtration device that receives the first slurry from the causticizer and filters the first slurry to remove an aqueous sodium hydroxide solution therefrom;
   a grinder that receives the first slurry from the filtration device and grinds the precipitated calcium carbonate in the first slurry; and
   a classifying device that classifies the first slurry containing ground calcium carbonate particles to remove a second aqueous slurry therefrom, which second slurry contains fine calcium carbonate particles.

8. The apparatus of claim 7, further comprising:
   a first weigh feeder for weighing out a predetermined amount of calcium hydroxide;
   a first tank;
   a first conveyer capable of feeding the predetermined amount of calcium hydroxide to the first tank for combination with water therein;
   a first screening device including a screen through which calcium hydroxide from the first tank can pass for removal of large particles therefrom prior to introduction into the causticizer;
   a second weigh feeder for weighing out a predetermined amount of sodium carbonate;
   a second tank;
   a second conveyer capable of feeding the predetermined amount of sodium carbonate to the second tank for combination with water therein; and
   a second screening device including a screen through which calcium hydroxide from the second tank can pass for removal of large particles therefrom prior to introduction into the causticizer.

9. The apparatus of claim 8, further comprising an evaporator for receiving the second slurry from the classifying device and reducing the moisture content thereof.

10. The apparatus of claim 9, further comprising conduits and associated feeders for feeding the associated materials from the causticizer to the filtration device, from the filtration device to the grinder, from the grinder to the classifying device, and from the classifying device to the evaporator.

11. An apparatus for the production of a carbonate slurry, comprising:

a mixing tank wherein a ground carbonate product is combined with a fresh aqueous slurry of carbonate particles;

a classifying device capable of separating a coarse fraction of carbonate particles larger than a predetermined size from the slurry to obtain a slurry of fine carbonate particles;

a grinder capable of comminuting the coarse carbonate fraction to form the ground carbonate product;

a coarse fraction tank interposed between the classifying device and the grinder wherein water is added to the coarse fraction prior to grinding;

conduits connecting the mixing tank, classifying device, coarse fraction tank and grinder in a closed circuit; and a pump for circulating the carbonate slurry through the conduits.

12. The apparatus of claim 11, wherein the classifying device is a centrifuge.

13. The apparatus of claim 11, further comprising an evaporator disposed to receive the slurry of fine carbonate particles from the classifying device.

14. The apparatus of claim 7, wherein the filtration device is a centrifuge.

15. The apparatus of claim 7, wherein the classifying device is a high speed centrifuge capable of removing into the second slurry calcium carbonate particles having sizes of 2 microns or less.

16. The apparatus of claim 15, wherein the grinder comprises a vertical media mill.

17. The apparatus of claim 7, further comprising:

a mixing tank wherein a ground carbonate product is combined with a fresh aqueous slurry of carbonate particles;

a coarse fraction tank interposed between the classifying device and the grinder wherein water is added to the coarse fraction prior to grinding;

conduits connecting the mixing tank, classifying device, coarse fraction tank and grinder in a closed circuit; and a pump for circulating the carbonate slurry through the conduits.

18. The apparatus of claim 17, wherein the grinder comprises a vertical media mill, and the classifying device is a high speed centrifuge capable of removing into the second slurry calcium carbonate particles having sizes of 2 microns or less.

19. The apparatus of claim 11, wherein the carbonate is calcium carbonate, and the classifying device is a high speed centrifuge capable of removing into the fine calcium particle slurry calcium carbonate particles having sizes of 2 microns or less.

20. The apparatus of claim 19, wherein the grinder comprises a vertical media mill.

* * * * *